Patented Mar. 16, 1926.

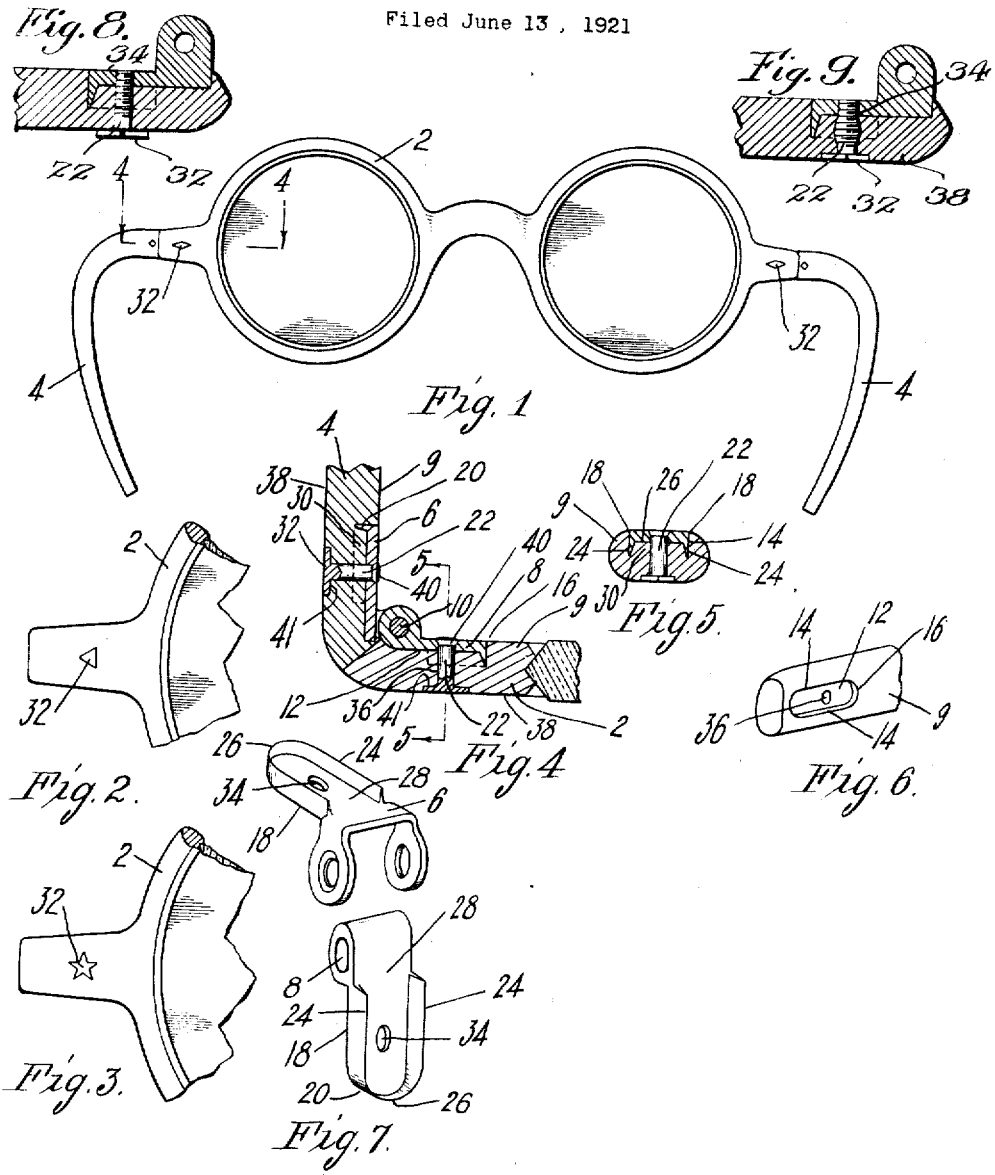

1,576,868

UNITED STATES PATENT OFFICE.

FREDERICK A. STEVENS AND JAMES W. WELSH, OF PROVIDENCE, RHODE ISLAND, ASSIGNORS, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed June 13, 1921. Serial No. 477,146.

*To all whom it may concern:*

Be it known that we, FREDERICK A. STEVENS and JAMES W. WELSH, citizens of the United States, and residents of Providence, in the county of Providence and State of Rhode Island, have jointly invented a new and useful Improvement in Ophthalmic Mountings, of which the following is a specification.

The present invention relates to articles of manufacture comprising members constituted of plastic material to which are secured metal members, and it has more particular application to ophthalmic mountings comprising non-metal members that are connected together by metal hinges.

In commercial ophthalmic mountings of the above-described character, the hinge plates have hitherto been secured to the non-metal members by pairs of rivets passing through the hinge plates and the members. These have not been fully satisfactory.

A chief object of the present invention is to improve upon ophthalmic mountings of the above-described character, to the end that a better joint may be provided between the metal and the non-metal parts, and the serviceableness and the utility of the mounting as a whole enhanced.

To the attainment of the above-named end, a feature of the invention resides in the use of a single rivet or screw extending through the metal plate and into the non-metal material to hold the parts together, the rivet or screw being shaped to prevent its turning, so that it can not become loose.

With the above and other objects in view, the invention consists more particularly of the improved ophthalmic mounting hereinafter described, illustrated in the accompanying drawings, and defined in the appended claims.

In the drawings, Fig. 1 is a front elevation of a pair of spectacles constructed according to a preferred embodiment of the present invention; Figs. 2 and 3 are views showing modified retaining rivets or screws; Fig. 4 is a section, taken upon the line 4—4 of Fig. 1, looking in the direction of the arrows; Fig. 5 is a section taken upon the line 5—5 of Fig. 4, looking in the direction of the arrows; Fig. 6 is a view of the end of a spectacle temple provided with a hinge-plate-receiving recess; Fig. 7 is a view of preferred hinge plates adapted for use according to the present invention, shown detached for clearness; and Figs. 8 and 9 illustrate a preferred method of securing the retaining rivet or screw in place.

The invention is for illustrative purposes shown in connection with a spectacle mounting comprising a lens-holding frame member 2 and temple members 4, constituted of plastic, non-metal material like celluloid, zylonite or other composition. The term "zylonite" will, for brevity, be employed in the specification and the claims as generic to all such materials. The temples 4 are pivotally connected to the lens-holding frame 2 by hinges comprising hinge plates 6 and 8 that are pivoted together at 10.

One face 9 of each of the non-metal members is recessed, the bottom wall of the recess 12 being substantially flat and the recess being shown provided with longitudinally extending walls 14 that may be straight and parallel, if desired, and that are connected by a transversely extending wall 16. There may be a wall opposed to the wall 16 or the recess may be open-ended, as desired. The hinge plates 6 and 8 are similarly substantially flat and are provided with walls 18 that are connected by a wall 20. The hinge plates and the recesses 12 are so shaped that the hinge plates will fit tightly in the recesses, the hinge plates lying flat against the bottom flat walls of the recesses, with the walls 18 in contact with the walls 14, and the wall 20 in contact with the wall 16. The walls 14, 16, 18 and 20 are made blunt to prevent rotation or twisting of the hinge plates within the recesses 12. A single rivet or screw 22, extending through the hinge plate and into the non-metal member, will be found sufficient to hold the hinge plates within their respective recesses.

According to the invention illustrated, described and claimed in a copending application Serial No. 743,956, filed October 16, 1924, the hinge plate is provided with one or more projecting parts that are caused to bite or wedge into and become embedded within the non-metal material. The hinge plate becomes thus securely mounted upon the non-metal member. The preferred construction is shown more particularly in Fig. 7, and comprises beveled wings 24, preferably along the walls 18, and a beveled wing 26, preferably along the wall 20, connecting the beveled wings 24. The wings 24 and 26 are shown continuous and offset from the inner face 28 of the hinge plate, to form a continuous, beveled, offset flange. The hinge plate, after being fitted into position in the recess 12, is forced home flush in the recess by pressure, causing the beveled wings to bite or wedge into, and become embedded within, the non-metal material, as above described.

As has been pointed out above, a single rivet 22 or its equivalent will suffice to hold the parts together, so that the necessity for weaking the non-metal material by multiple riveting is avoided. The rivet or other holding member, however, should not be permitted to turn, as it would then become loose and dislodged. It is accordingly provided with an irregular or non-round portion 32 that is sunk into the non-metal material. Unnecessary turning of the rivet or screw and premature wear are thus avoided. The irregular portion may conveniently be formed upon the head of the rivet, and as it will then become exposed to view, as will be clear from Fig. 4, it is desirable, for appearance sake, to have it assume some pleasing contour, such as the diamond of Fig. 1, the triangle of Fig. 2 or the star of Fig. 3. The rivet thus combines within itself the properties both of utility and ornament. In practice, the rivet or screw 22 will be mounted in previously formed alined bores 34 and 36 of the hinge plate and the non-metal member, respectively. Its suitably shaped head may then be forced into the non-metal member, or into a previously formed, correspondingly irregularly shaped, recess 41, Fig. 4, flush with the face 38, and the opposite end of the rivet may finally be headed over against the hinge plate, as shown at 40. If a screw is employed, it may be screwed into the screw-threaded bore 34 of the hinge plate, and then upset by pressure applied to the opposite ends of the screw, as will be clear from Figs. 8 and 9. The head 32 will thus be forced into position, flush with the face 38 of the non-metal member, and the body of the screw will be caused to bulge out, Fig. 9, effecting a very tight union of the parts.

Many other modifications within the spirit and scope of the invention will readily suggest themselves to persons skilled in the art. The above description is therefore intended to be illustrative and not restrictive, and it is desired that the appended claims be broadly construed, unlimited except in so far as limitations may be imposed by the prior art.

What is claimed as new is:

1. An ophthalmic mounting comprising a non-metal member, a second member, a hinge plate for hinging the members together, and a securing element extending through the hinge plate and the non-metal member for securing the hinge plate to the non-metal member, the securing element having an irregular portion engaging with the non-metal member for preventing movement of the securing element.

2. An ophthalmic mounting comprising a non-metal member, a second member, a hinge plate for bringing the members together, and an element having an irregular head extending through the hinge plate and the non-metal member, the head of the element being sunk into the non-metal member flush with a face thereof.

3. An ophthalmic mounting comprising a non-metal member, a second member, a hinge plate for hinging the members together mounted upon the non-metal member flush with a face of the non-metal member, and a securing element extending through the non-metal member and the hinge plate for securing the hinge plate to the non-metal member, the securing element having an irregular head sunk into the non-metal member flush with another face of the member.

4. The combination with a non-metal member having a face provided with a substantially flat-bottomed recess, of a substantially flat metal plate mounted in the recess substantially flush with the said face, and a securing element extending through the plate and the non-metal member for securing the plate to the non-metal member, the securing element having an irregular portion sunk into the non-metal member for preventing movement of the securing element.

5. An ophthalmic mounting comprising a non-metal member having an irregular recess, a second member, a hinge member for bringing the members together, and means for securing the hinge member to the non-metal member having an irregular portion shaped to conform to and mounted within the irregular recess for preventing movement of the securing means.

6. An ophthalmic mounting comprising a non-metal member having recesses in oppositely disposed faces, a hinge plate mounted in one of the recesses, the other recess being irregular in shape, and a securing element extending through the hinge plate and the non-metal member for securing the hinge plate to the non-metal member, the securing element having an irregular portion shaped to conform to and mounted within the irregular recess for preventing movement of the securing element.

7. An ophthalmic mounting comprising a member constituted of plastic material having an irregular recess, a hinge having wings biting into and embedded within the member, and means extending through the hinge and into the member for securing the hinge to the member having an irregular metal member shaped to conform to and mounted within the irregular recess flush with a face of the member, whereby relative movement of the member and the extending means is prevented.

8. An ophthalmic mounting comprising a member constituted of plastic material having a recess, a plate seated within the recess, means extending through the plate and the member for securing the plate to the member, and means integral with the extending means for preventing movement of the extending means, the integral means and the extending means being constituted of a single, unbroken piece of material.

9. An ophthalmic mounting comprising a non-metallic member having a recess, a hinge plate seated within the recess and a single element extending through the hinge plate and the member for securing the hinge plate to the member, the element having an irregular portion sunk into the member.

10. An ophthalmic mounting comprising a member constituted of plastic material one face of which is recessed, a hinge plate seated within the recess having a portion biting into and embedded within the member, and an element extending through the member and the hinge plate having an irregular head flush with another face of the member.

11. An ophthalmic mounting comprising a member constituted of plastic material having a recess in one face, a hinge plate lying within the recess, and an upset element having an irregular head extending through the hinge plate and into the member, the head of the element being pressed into and flush with another face of the member and the body of the element bulging.

12. An ophthalmic mounting comprising a lens-holding frame and a temple, one of which comprises non-metal material and is provided with a recess, a hinge pivotally connecting the frame and the temple comprising a hinge plate mounted in the recess, and a securing element extending through the non-metal material and the hinge plate and having an irregular portion sunk into the non-metal material for preventing movement of the securing element.

13. An ophthalmic mounting comprising a lens-holding frame and a temple each comprising non-metal material, and a hinge pivotally connecting the frame and the temple comprising two hinge plates pivoted together, the frame and the temple each being provided with a recess in which recesses the hinge plates are mounted, a securing element extending through the non-metal material of the frame and the hinge plate mounted thereon, and a securing element extending through the non-metal material of the temple and the hinge plate mounted thereon, the securing elements each having an irregular portion sunk into the non-metal material for preventing movement of the securing elements.

14. In combination, a non-metal member, a second member, and a screw extending through the members for securing the members together, the screw being upset to cause its body portion to bulge, whereby the threads of the screw bite into the non-metal member to effect a very tight union of the parts.

15. An ophthalmic mounting comprising a lens-holding frame and a temple, one of which comprises non-metal material and is provided with a recess, a hinge pivotally connecting the frame and the temple comprising a hinge plate mounted in the recess, and a screw extending through the non-metal material and the hinge plate for securing the hinge plate to the non-metal material, the screw being upset to cause its body portion to bulge, whereby the threads of the screw bite into the non-metal material to effect a very tight union of the parts.

In testimony whereof, we have hereunto subscribed our names this 8th day of June, 1921.

FREDERICK A. STEVENS.
JAMES W. WELSH.

a member constituted of plastic material having an irregular recess, a hinge having wings biting into and embedded within the member, and means extending through the hinge and into the member for securing the hinge to the member having an irregular metal member shaped to conform to and mounted within the irregular recess flush with a face of the member, whereby relative movement of the member and the extending means is prevented.

8. An ophthalmic mounting comprising a member constituted of plastic material having a recess, a plate seated within the recess, means extending through the plate and the member for securing the plate to the member, and means integral with the extending means for preventing movement of the extending means, the integral means and the extending means being constituted of a single, unbroken piece of material.

9. An ophthalmic mounting comprising a non-metallic member having a recess, a hinge plate seated within the recess and a single element extending through the hinge plate and the member for securing the hinge plate to the member, the element having an irregular portion sunk into the member.

10. An ophthalmic mounting comprising a member constituted of plastic material one face of which is recessed, a hinge plate seated within the recess having a portion biting into and embedded within the member, and an element extending through the member and the hinge plate having an irregular head flush with another face of the member.

11. An ophthalmic mounting comprising a member constituted of plastic material having a recess in one face, a hinge plate lying within the recess, and an upset element having an irregular head extending through the hinge plate and into the member, the head of the element being pressed into and flush with another face of the member and the body of the element bulging.

12. An ophthalmic mounting comprising a lens-holding frame and a temple, one of which comprises non-metal material and is provided with a recess, a hinge pivotally connecting the frame and the temple comprising a hinge plate mounted in the recess, and a securing element extending through the non-metal material and the hinge plate and having an irregular portion sunk into the non-metal material for preventing movement of the securing element.

13. An ophthalmic mounting comprising a lens-holding frame and a temple each comprising non-metal material, and a hinge pivotally connecting the frame and the temple comprising two hinge plates pivoted together, the frame and the temple each being provided with a recess in which recesses the hinge plates are mounted, a securing element extending through the non-metal material of the frame and the hinge plate mounted thereon, and a securing element extending through the non-metal material of the temple and the hinge plate mounted thereon, the securing elements each having an irregular portion sunk into the non-metal material for preventing movement of the securing elements.

14. In combination, a non-metal member, a second member, and a screw extending through the members for securing the members together, the screw being upset to cause its body portion to bulge, whereby the threads of the screw bite into the non-metal member to effect a very tight union of the parts.

15. An ophthalmic mounting comprising a lens-holding frame and a temple, one of which comprises non-metal material and is provided with a recess, a hinge pivotally connecting the frame and the temple comprising a hinge plate mounted in the recess, and a screw extending through the non-metal material and the hinge plate for securing the hinge plate to the non-metal material, the screw being upset to cause its body portion to bulge, whereby the threads of the screw bite into the non-metal material to effect a very tight union of the parts.

In testimony whereof, we have hereunto subscribed our names this 8th day of June, 1921.

FREDERICK A. STEVENS.
JAMES W. WELSH.

Certificate of Correction.

It is hereby certified that in Letters Patent No. 1,576,868, granted March 16, 1926, upon the application of Frederick A. Stevens and James W. Welsh, of Providence, Rhode Island, for an improvement in "Ophthalmic Mountings," errors appear in the printed specification requiring correction as follows: Page 2, line 18, for the misspelled word "weaking" read *weakening;* same page, line 112, claim 5, for the word "bringing" read *hinging;* and that the said Letters Patent should be read with these corrections therein that the same may conform to the record of the case in the Patent Office.

Signed and sealed this 22d day of June, A. D. 1926.

[SEAL.]

M. J. MOORE,
*Acting Commissi ier of Patents.*

Certificate of Correction.

It is hereby certified that in Letters Patent No. 1,576,868, granted March 16, 1926, upon the application of Frederick A. Stevens and James W. Welsh, of Providence, Rhode Island, for an improvement in "Ophthalmic Mountings," errors appear in the printed specification requiring correction as follows: Page 2, line 18, for the misspelled word " weaking " read *weakening;* same page, line 112, claim 5, for the word " bringing " read *hinging;* and that the said Letters Patent should be read with these corrections therein that the same may conform to the record of the case in the Patent Office.

Signed and sealed this 22d day of June, A. D. 1926.

[SEAL.]
M. J. MOORE,
*Acting Commissioner of Patents.*